Oct. 9, 1951  R. LEE  2,570,570
TOOL CHUCK
Filed Aug. 22, 1949
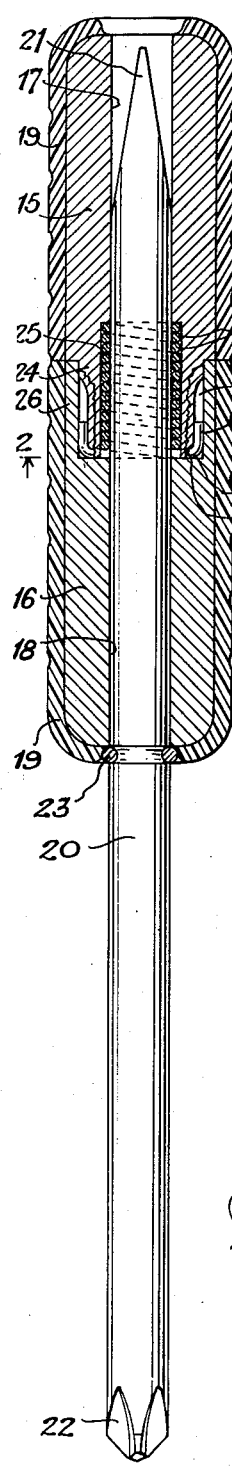
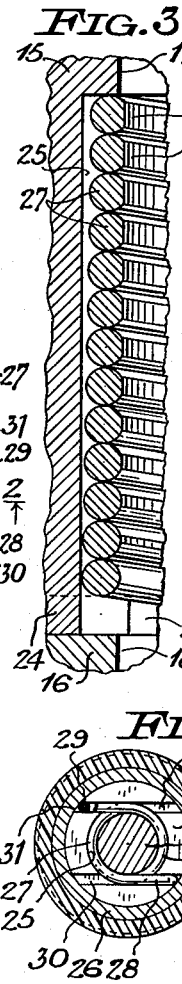
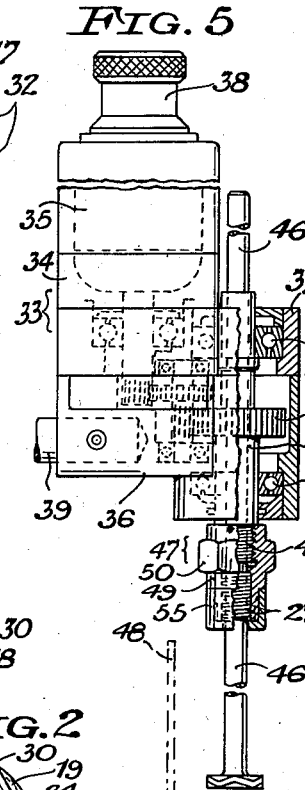
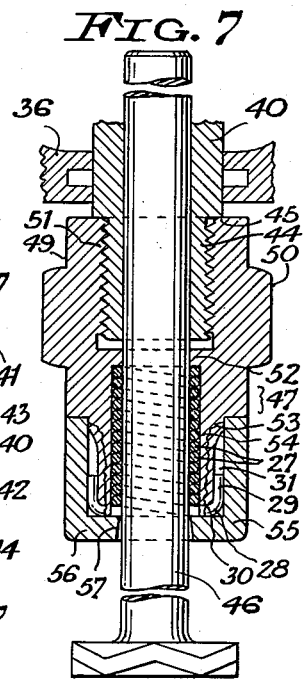
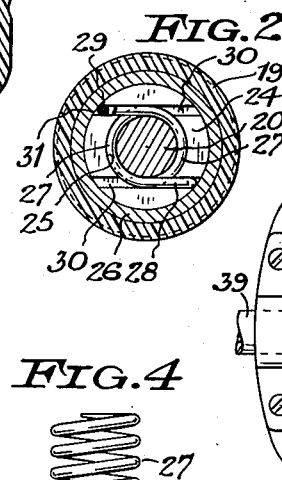
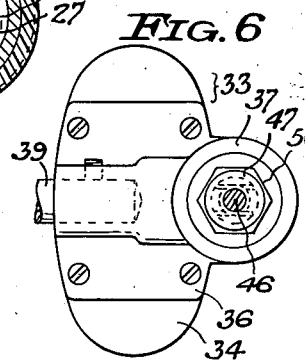
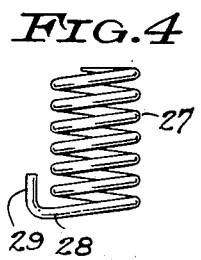
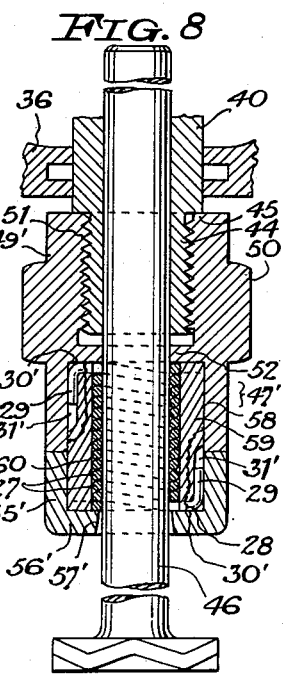
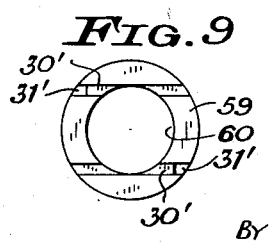
INVENTOR
ROYAL LEE
BY Christopher L. Waal
ATTORNEY Patented Oct. 9, 1951

2,570,570

UNITED STATES PATENT OFFICE 2,570,570

TOOL CHUCK

Royal Lee, Elm Grove, Wis., assignor to Lee Foundation for Nutritional Research, Milwaukee, Wis., a corporation of Wisconsin Application August 22, 1949, Serial No. 111,623

7 Claims. (Cl. 279—23)

The present invention relates to chucks adapted for holding and driving rotatable members such as tool elements and the like.

An object of the invention is to provide a simple, durable and inexpensive chuck which is adapted for detachably engaging a rotatable member in driving relation thereto, and which can readily be incorporated in various tools, such as screw drivers and stirring devices.

Another object is to provide an improved chuck which includes one-way clutching means and which will minimize lost motion in driving direction.

A further object is to provide a tool chuck in which a tool shank can be inserted from either end, as for reversing the direction of drive.

A still further object is to provide a tool chuck which will frictionally retain an axially shiftable tool element, such as a stirring rod or shaft, in selected longitudinally adjusted positions, and which will effect driving of the tool element in any of the selected positions without requiring manipulation of the chuck.

The invention further consists in the several features hereinafter described and claimed.

In the accompanying drawing, illustrating certain embodiments of the invention,

Fig. 1 is a longitudinal sectional view of a detachable-shank screw driver constructed in accordance with the invention;

Fig. 2 is a transverse sectional view of the screw driver, taken generally on the line 2—2 of Fig. 1;

Fig. 3 is an enlarged detail sectional view of the chuck portion of the screw driver;

Fig. 4 is a detail elevation of a clutch spring;

Fig. 5 is a fragmentary elevation of a motor-driven laboratory stirring device including a chuck constructed in accordance with the invention, parts being shown in section, and the chuck being engaged with a stirring rod or shaft;

Fig. 6 is a bottom view of the stirring device and chuck, the stirring rod being shown in section;

Fig. 7 is an enlarged vertical sectional view of the stirring rod chuck;

Fig. 8 is an enlarged vertical sectional view of a modified form of chuck, and

Fig. 9 is an end view of a sleeve member for the chuck of Fig. 8.

Referring to Figs. 1 to 4 of the drawings, the screw driver illustrated therein includes a tubular handle open at both ends and formed by complementary handle sections or chuck body sections 15 and 16 of generally cylindrical shape joined end to end as hereinafter described. The handle sections 15 and 16, which have respective axial bores 17 and 18 therethrough, are preferably formed of metal, and if desired have rigidly secured thereto corrugated non-metallic handgrips 19, such as of plastic material. The tubular handle is adapted to admit therein from either end a slidably fitting cylindrical shaft or tool shank 20 having opposite screw-engaging ends of various types. By way of example, the tool shank has a wedge-shaped blade portion 21 at one end for use with ordinary slotted-head screws, and a fluted portion 22 at the other end for use with Phillips screws. About midway of its length the tool shank has an annular bead or rib formed as by a snap ring 23 which limits the entrance of the shank into the handle and also forms a thrust shoulder. When the tool shank is fully inserted, the unused upper end of the shank is within and near the upper end of the handle so as not to interfere with the manipulation of the handle, and the tool shank fits within both of the handle sections.

The handle section 15 has a reduced cylindrical lower end portion 24 in which is formed an elongated central counterbore 25, and the handle section 16 has a cup-shaped end portion 26 which is fitted tightly over the cylindrical end portion 24 for firmly joining the two handle sections. One or more helically coiled clutch springs 27 are housed in the counterbore 25, and preferably two identical springs are provided, as shown. The two springs are interwound, each spring having spaced convolutions to accommodate the other spring. Each clutch spring has a tangentially disposed end portion 28 which terminates in a hook 29 extending parallel to the axis of the spring and projecting toward the other end of the spring. The flat end face of the reduced end portion 24 of the handle section 15 has formed therein a pair of parallel transverse grooves 30, Fig. 2, tangential to and at opposite sides of the counterbore 25. One end of each transverse groove 30 communicates with a longitudinal groove 31 cut in the peripheral surface of the reduced handle end portion 24 in parallel relation to the handle axis. The two spring end portions 28 lie in the respective transverse grooves 30 and have their end hooks 29 lying in the respective longitudinal grooves 31. After the springs are inserted in place, the cupped end 26 of the handle section 16 is pressed over the reduced end portion 24 of the handle section 15 and laterally engages the end hooks 29 of the springs, thus firmly anchoring the hooked spring ends. The other ends of the two coiled springs are near the inner end of the counterbore 25 and are free to twist when the springs are subjected to torsional action.

Each coiled spring is wound to taper slightly toward its free end and after the two springs are interengaged they are internally ground, as by an abrasive pencil, to form cylindrical shank-engaging lands 32, Fig. 3, along their inner surfaces for a considerable part of the axial length of the springs. At their anchored ends the coiled springs have an internal diameter approximately the same size as the tool shank, and at their internally ground free ends the springs have an internal diameter slightly smaller than the shank but are expansible by the tool shank when the latter is axially inserted, thus causing the springs to frictionally grip the shank.

When the screw driver is to be used, the idle end of the tool shank 20 is inserted into a selected end of the chuck-forming handle, according to the direction of shank rotation desired. The insertion of the shank is facilitated by simultaneously twisting the shank or handle, or both, in the proper direction. In Fig. 1, the screw driver is arranged for driving right-hand Phillips screws in clockwise direction. Upon turning the handle in clockwise direction, as viewed from above, the frictional engagement of the free end portions of the coiled springs 27 causes the springs, which are anchored at their other ends on the handle, to wrap or contract about and firmly grip the tool shank in torque-transmitting engagement, thus turning the tool shank in driving direction. Initial lost motion or backlash is minimized by proper fitting of the parts. Upon turning the handle in counter-clockwise direction, the grip of the springs on the shaft is somewhat relaxed, permitting the handle to turn in this direction without turning the tool shank if the screw offers a sufficient resistance to rotation, thus minimizing chafing of the user's hand. When it is desired to screw out a Phillips screw, the handle is removed from the shank and replaced thereon end for end, thus causing clutching to occur when the handle is turned in counter-clockwise direction.

When the screw driver is to be used with ordinary screws, the tool shank is reversed in the handle to expose the blade end 21 of the shank, and the relation of the handle to the shank is selected for driving the screws in the desired direction.

In the construction shown in Figs. 5 to 7, chuck means of the invention is applied to a motor-driven laboratory stirring device designated generally by 33. The stirring device comprises an electric motor 34 including a housing 35 and having at its lower end a reduction gear head 36 with a portion 37 projecting laterally of the motor housing. The upper end of the motor is here shown to be provided with a speed control 38. The motor is suitably supported, as by a horizontal rod 39 inserted laterally into the gear head 36. A tubular drive shaft 40, open at its upper and lower ends, is journalled in the gear head on ball bearings 41 and 42 and has an intermediate driving gear 43 forming part of the gear train in the gear head. The upper and lower ends of the drive shaft project from the gear head, and the lower end has a reduced screw-threaded nose 44 forming an annular shoulder 45. A stirring rod or shaft 46, of metal or glass, slidably extends through the tubular drive shaft, the upper end portion of the rod being laterally spaced from the motor housing, as seen in Fig. 5.

The stirring rod or shaft 46 is detachably coupled to the drive shaft 40 by a chuck designated generally by 47, and is adapted to project downwardly a selected distance into a liquid receptacle 48. The chuck comprises a tubular chuck body 49, such as of metal, having wrench-receiving abutments 50 and having at its upper end a screw-threaded opening 51 detachably receiving the threaded lower end or nose 44 of the drive shaft 40, the upper end of the chuck body abutting against the stop shoulder 45. Immediately below the opening 51 the chuck body has a short intermediate bore 52 the diameter of which is slightly larger than the diameter of the stirring rod. The chuck body also has a reduced cylindrical lower end portion 53 in which is formed an elongated counterbore 54 coaxial with the bore 52. As in the device of Fig. 1, two interwound helically coiled clutch springs 27 are housed in the counterbore, and the flat end face of the reduced lower end portion 53 of the chuck body has tangential grooves 30 communicating with longitudinal grooves 31 cut in the end portion 53 to receive the projecting ends 28, 29, of the clutch springs. After insertion of the springs, a collar member 55 is pressed over the chuck body end portion 53, thus firmly anchoring the spring ends. The collar member 55 is here shown to have a bottom wall 56 with a central rod-receiving opening 57.

When the stirring device is to be used, the stirring rod or shaft 46 is inserted in the lower end of the chuck body and is extended through the tubular driver shaft 40 to the desired elevation, being retained in vertically adjusted position by frictional contact with the clutch springs 27. Rotation of the drive shaft by the motor in a clockwise direction, as viewed from above, will cause the clutch springs to wrap or contract about and firmly grip the stirring rod, thus rotating the rod. If it is desired to change the elevation of the stirring rod, this can readily be done when the motor is at rest, without requiring any manipulation of the chuck, and being readily accessible for effecting vertical adjustment of the rod.

The modified form of stirring rod chuck 47' shown in Figs. 8 and 9 is arranged for driving the stirring rod or other tool in either direction instead of providing a one-way drive. The chuck comprises a chuck body 49' having a screw threaded upper end opening 51, as in the device of Figs. 5 to 7, for attachment to the tubular drive shaft 40. The lower end of the chuck body has a tubular portion forming a coaxial cylindrical recess 58. A metal sleeve 59 is pressed into the recess 58 and has a cylindrical bore 60 adapted to house therein a pair of interwound clutch springs 27 having their hooked ends 28, 29 at opposite ends of the sleeve. The sleeve 59 has transverse tangential grooves 30' at opposite ends communicating with longitudinal grooves 31' along the outer periphery of the sleeve. One of the clutch springs 27 has its hooked end engaged in the grooved lower end of sleeve 59, and the other clutch spring has its hooked end engaged in the grooved upper end of the sleeve, the anchorage of each spring end being otherwise like that of Figs. 2 and 7. A collar 55' is pressed over the lower end of the sleeve 59 and is here shown to have an end wall 56' adjacent to the lower end of the sleeve and provided with a central opening 57'. Although the two clutch springs are preferably identical, as shown, they are wound in opposite directions from their secured ends.

The stirring rod 46 is frictionally held in the chuck at a desired elevation and upon rotating the tubular shaft 40 in either direction, one or the other of the clutch springs 27 will wrap or contract about the rod and drive the rod. As in the device of Fig. 7, the stirring rod is vertically adjusted while the motor is at rest, and no manipulation of the chuck is required to establish the driving connection.

What I claim as new and desire to secure by Letters Patent is:

1. A chuck comprising a hollow chuck body having an axial opening therethrough adapted to receive a shaft from either end, a helically coiled clutch spring disposed in said body in alignment with said opening, one end of said spring being secured to said chuck body and the other end being free, said clutch spring being adapted to receive the shaft therein and to frictionally embrace said shaft for causing said spring to torsionally tighten about said shaft in driving engagement therewith when said chuck body and shaft are relatively rotated.

2. A chuck comprising a chuck body having a tubular portion with an axial bore and a transverse end groove substantially tangent to said bore, said tubular portion further having an exterior groove communicating with said transverse groove, a helically coiled clutch spring disposed in said bore and having a tangential end portion in said transverse groove and a terminal part in said exterior groove, the other end of said spring being free, and a securing member fitting over said tubular portion and engaging the terminal part of said spring in said exterior groove to hold said terminal part in position, said clutch spring being adapted to receive a shaft therein and to frictionally embrace said shaft for causing said spring to torsionally tighten about said shaft in driving engagement therewith when said chuck body and shaft are relatively rotated.

3. In a hand tool, a hollow handle having an axial opening adapted to receive therein either end of a tool shank with a tool portion at each end, and a helically coiled clutch spring in said handle, one end of said spring being anchored to said handle and the other end being free, said clutch spring being adapted to frictionally embrace said tool shank for causing said spring to torsionally tighten about said shank in driving engagement therewith when said handle is rotated, said opening having a reduced portion beyond the inner end of said spring for receiving said tool shank.

4. In a hand tool, a tubular handle open at both ends and adapted to detachably receive a tool shank therein from either end, and a helically coiled clutch spring disposed axially in said handle, one end of said spring being anchored to said handle and the other end being free, said clutch spring being adapted to frictionally embrace said tool shank for causing said spring to torsionally tighten about said shank in one-way driving engagement therewith when said handle is rotated.

5. In a hand tool, a hollow handle adapted to receive a tool shank therein, said handle comprising handle sections joined end to end and each handle section having an axial shank-receiving opening therethrough, and a helically coiled clutch spring in the inner end portion of one of said handle sections and enclosed by the other handle section, one end of said spring being anchored to said handle and the other end being free, said clutch spring being adapted to frictionally embrace said tool shank for causing said spring to torsionally tighten about said shank in driving engagement therewith when said handle is rotated.

6. A chuck comprising a hollow chuck body, a pair of helically coiled clutch springs disposed axially in said body and each having one end portion secured to said body and the other end portion free, said springs being wound in opposite directions from their secured end portions, said springs being adapted to frictionally embrace a shaft therein to retain said shaft and to cause one of said springs to torsionally tighten about said shaft in driving engagement therewith when said chuck body and shaft are relatively rotated in one direction, and to cause the other spring to torsionally tighten about said shaft in driving engagement therewith when said chuck body and shaft are relatively rotated in the other direction.

7. A chuck comprising a chuck body, a sleeve axially secured in said chuck body and grooved at opposite ends, and a pair of first and second helically coiled clutch springs coaxially disposed in said sleeve, an end of said first spring being secured at one end of said sleeve, and an end of the second spring being secured at the other end of said sleeve, means for anchoring said spring ends in said grooved ends of the sleeve, the other ends of said spring being free, said springs being wound in opposite directions from their secured end portions, said springs being adapted to frictionally embrace a shaft therein to cause one of said springs to tighten about said shaft in driving engagement therewith when said chuck body and shaft are relatively rotated in one direction and to cause the other spring to torsionally tighten about said shaft in driving engagement therewith when said chuck body and shaft are relatively rotated in the other direction.

ROYAL LEE.

REFERENCES CITED

The following references are of record in the file of this patent:

UNITED STATES PATENTS

| Number | Name | Date |
| --- | --- | --- |
| 1,084,190 | Barnett | Jan. 13, 1914 |
| 1,127,129 | Warner et al. | Feb. 2, 1915 |
| 1,552,085 | Shick | Sept. 1, 1925 |
| 2,105,330 | Pagenkopf | Jan. 11, 1938 |
| 2,131,284 | Isturiz | Sept. 27, 1938 |
| 2,467,606 | Young | Apr. 19, 1949 |